CHARACTER GENERATOR HAVING STORED CONTROL SIGNALS

Filed Jan. 2, 1962 3 Sheets-Sheet 1

INVENTOR.
WILLIAM D. HOUGHTON
BY Morris A. Rabkin
ATTORNEY

CHARACTER GENERATOR HAVING STORED CONTROL SIGNALS

Filed Jan. 2, 1962 3 Sheets-Sheet 2

INVENTOR.
WILLIAM D. HOUGHTON
BY Morris L. Rabkin
ATTORNEY

CHARACTER GENERATOR HAVING STORED CONTROL SIGNALS

Filed Jan. 2, 1962 3 Sheets-Sheet 3

INVENTOR.
WILLIAM D. HOUGHTON
BY Morris A. Rabkin
ATTORNEY 3,255,444
CHARACTER GENERATOR HAVING STORED CONTROL SIGNALS
William D. Houghton, Princeton, N.J., assignor to Radio Corporation of America, a corporation of Delaware
Filed Jan. 2, 1962, Ser. No. 163,404
15 Claims. (Cl. 340—324)

This invention relates to information translation apparatus, and more particularly to a system for translating information represented by a code into visible form.

The invention is especially suitable for use in presenting or reading out coded information from the output of an electronic digital computer or the like in the form of alpha-numeric characters. The characters may suitably be displayed or printed so as to make the information readily available in convenient form. The invention is, however, generally useful for generating a sequence of signals which represent many types of symbols. The generated signals may be used to control apparatus for displaying or printing the symbols.

Since digital computers can deliver coded information at very high speed, it is desirable to provide devices which are capable of translating the coded information into printed or otherwise displayed form at correspondingly high speed. It is desirable that the printing be highly legible, as well as at very high speed.

Various arrangements have been used to translate coded information into characters. However, many of these arrangements have not been able to satisfy the requirements of high speed read-out and legibility of the displayed and printed information. Moreover, available high speed read-out equipment is usually complex and expensive. For example, known arrangements which involve cathode ray tube type displays include extensive and complex electronic circuitry for generating character representing signals which can be translated into legible form on the screen of the cathode ray tube.

Accordingly, it is an object of the present invention to provide improved apparatus for translating coded information into symbols represented by such information for printing or display purposes.

It is a further object of this invention to provide a system which produces characters and other symbols in response to coded information and which is operative to produce such symbols and characters at very high speeds.

It is a still further object of this invention to print or display characters represented by coded information at high speed and also with a high degree of legibility.

It is a still further object of the present invention to provide apparatus for translating coded information which represents alpha-numeric characters into signals suitable for operating display and/or printing devices, which apparatus is operative at very high speed, relatively inexpensive, and relatively of small size as compared to any equipment heretofore available for similar purposes.

The foregoing objects and advantages may be obtained in a system embodying the invention for electrically generating characters and displaying these characters in visible form. This system may include a rotatable drum having a plurality of peripheral tracks thereon. Different ones of several of these tracks are permanently formed with repeated sequences of stored signals. All sequences of stored signals on the same track are representations of the same character. The different tracks each contain representations of different ones of a plurality of characters. In addition to the tracks which are formed with information representing successive repetitions of different characters, there are provided a plurality of tracks which permanently store synchronizing signals in positions related to the positions of the sequences of stored signals representing the different characters on the character tracks. A separate transducer is provided for each of the tracks. When the drum is rotated, signals representing successive repetitions of each character and synchronization information all are available simultaneously at the output of each transducer. A display device for presenting characters in visible form is also provided. Coded information, for example, from the output of an electronic digital computer may be used to control switching means for delivering the sequences of signals from any one of the repeated repetitions of the characters on any one of the character tracks to the display device. The display device may be controlled by the synchronizing signals. The read-out of the signals from each of the character tracks is also so related to the synchronizing information that the characters may be controlled to display the characters in highly legible form. Since the drum may be rotated at very high speeds, and since repetitions of each of the characters are available from each of the charater tracks, the access time to any selected character is exceedingly small. The relationship of the synchronizing signals and the signals representing characters is permanently stored on the drum. Accordingly, the display of such characters under the control of the synchronizing signals, at high speed, results in the production of highly legible characters.

The invention itself, both as to its organization and method of operation, as well as additional objects and advantages thereof, will become more readily apparent for a reading of the following description in connection with the accompanying drawings, in which.

Figure 1:
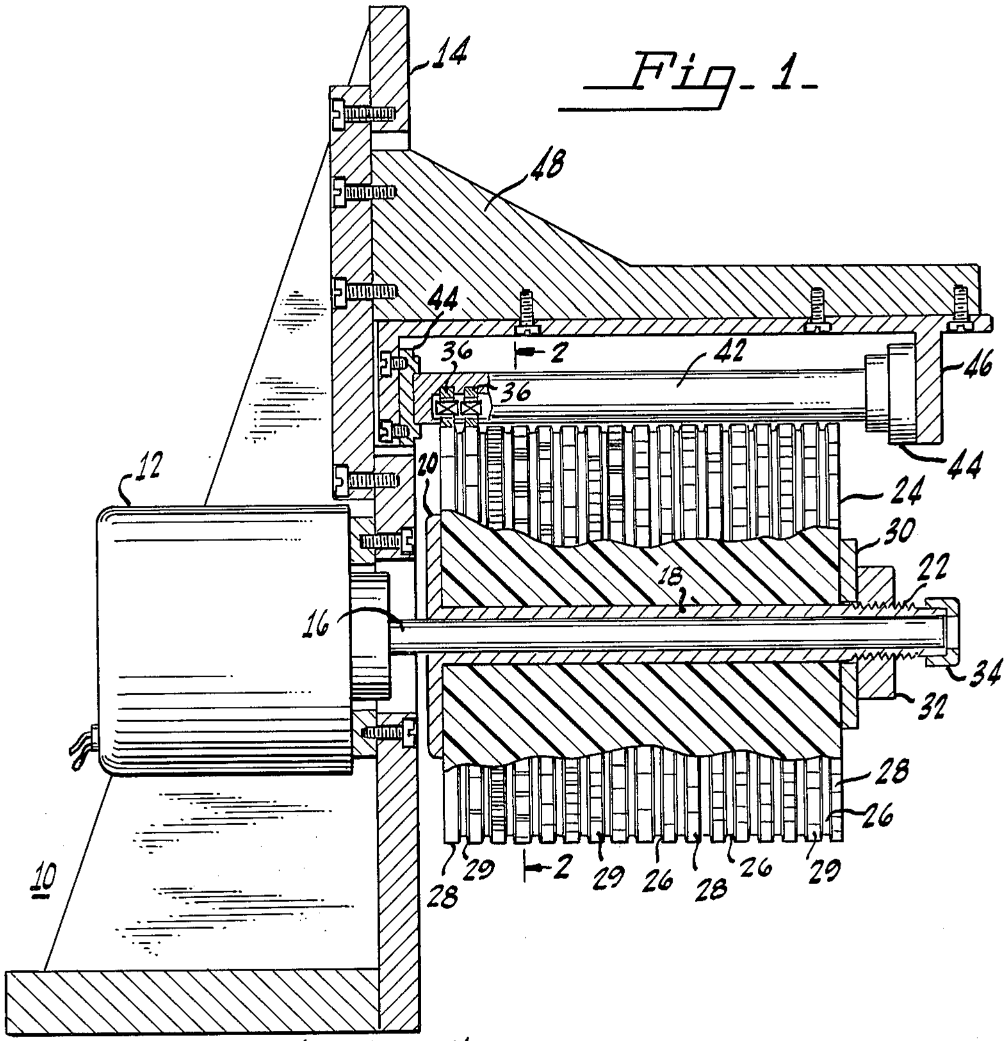
FIG. 1 is a front elevational view, partially in section, of a character signal generator embodying the invention.
Figure 2:
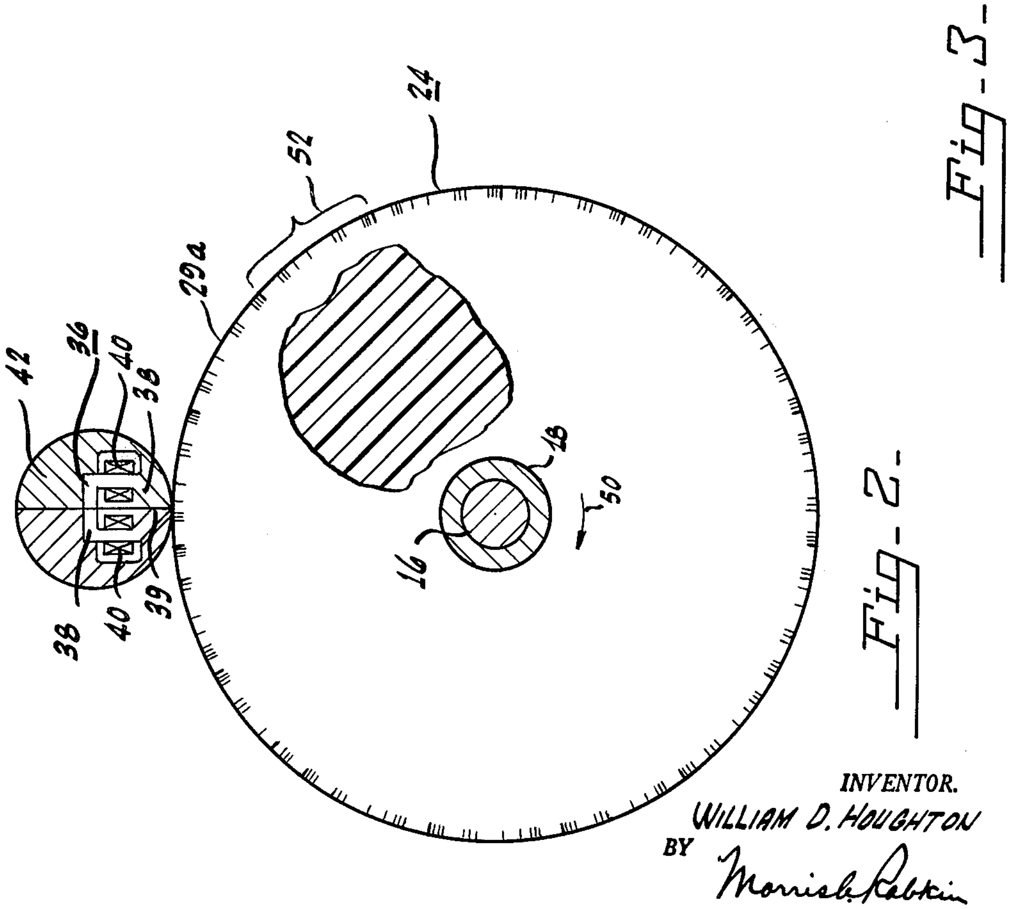
FIG. 2 is a sectional view taken along the line 2—2 of FIG. 1 and partly broken away to more clearly show certain parts.

Referring more particularly to FIGS. 1 and 2, a standard 10 is used to mount an electrical motor 12 on an upright plate 14 which is part of the standard. This motor 12 is desirably a high speed synchronous motor. The shaft 16 of the motor 12 has a collar 18 keyed thereto. The collar 18 has a flange 20 on the left end thereof and has external threads 22 near the right end thereof. (The terms left and right are with reference to the left and right sides of FIG. 1 and are used for purposes of convenience of reference in the course of the description.) A drum 24 is mounted on the collar 18. This drum 24 is made of plastic or other non-magnetic material, either in one piece or of separate rings suitably keyed together. The drum has a plurality of peripheral grooves 26 therein which define a plurality of ridges 28 on the surface of the drum. Each of these ridges constitutes the base for a different one of a plurality of record tracks. The ridges have line engravings thereon each of which is parallel to the axis of the drum (the axis of the drum coincides with the axis of the shaft 16). Different numbers of engravings are made in each of the record tracks. The engravings in each track also have different relationships to each other. The relationships of the engravings in the tracks which are used for synchronizing purposes, however, are in positions related to the engravings in other tracks which store information representing different characters. Each engraving on the character tracks is translated into a part (a dot) of the character which it represents by means of the apparatus to be described hereinafter.

The engravings are filled with magnetic material which is permanently magnetized, and constitute the stored information signals. A suitable magnetic material, for example, is lead barium ferrite. The engravings are preferably magnetized in a direction circumferentially of the drum. This may be done by magnetizing the drum 24 prior to assembly on the collar 18 or by means of a permanent magnet or magnets mounted adjacent to the drum so that the engravings are each re-magnetized on each revolution of the drum.

The drum 24 is locked to the collar 18 by means of a washer 30 which is pressed against the right side of the drum 24 by means of a locking nut 32 which is screwed on to the threads 22 near the right end of the collar 18. The drum is therefore squeezed between the flange 20 on the collar and the washer 30 so that the drum 24 is held tightly on the collar 18 and rotates therewith.

A split ring cap 34 is secured in tight engagement with the right end of the collar 18 just past the threads 22 and serves to prevent any vibration of the collar 18 on the shaft 16.

A plurality of individual signal transducing devices in the form of magnetic heads 36 are used to read the record tracks 29. These heads 26 are generally of the ring type and are known in the art. The heads 36 have a pair of generally U-shaped core parts 38, each of which parts 38 has a signal coil 40 wound thereon (see FIGURE 2). A bi-part non-magnetic support 42 contains the magnetic heads 36. The construction of the heads and the bi-part, non-magnetic support 42 is generally as in known magnetic head assembly structures.

Flanges 44 (see FIGURE 1) are disposed at the opposite ends of the support 42. These flanges are screwed into a hanger bracket 46. The hanger bracket 46 is mounted on another bracket 48 which is secured to the upright plate 14 of the standard 10. The brackets 46 and 48 maintain the respective heads 36 in scanning relationship with different ones of the tracks 29 on the character signal generating drum 24. It will be appreciated that a limited number of tracks are shown on the drum for purposes of convenience of illustration. Also, the width of the tracks has been somewhat exaggerated in the interest of clarity of illustration. It is desirable that there be 64 different tracks, one for each of the different alphanumeric characters and symbols which might be represented by a digital code. Three synchronizing and control tracks are also used making a total of 67 tracks.

A typical character track **29*a* is shown in FIG. 2 for the purpose of illustrating the relationships among the engravings. Each of the engravings is shown, for convenience in FIG. 2, by a short radial line extending from the periphery of the drum 24. These lines are not drawn to scale, but merely indicate the positions and relative dispositions of the various engravings. In practice, the engravings may extend axially along the periphery of the drum and into the drum approximately 5 mils (thousandths of an inch). The engravings are arranged in 15 groups each of which constitutes a repeated sequence of stored signals and represents a repetition of the same character. The first engraving in each group is shown in the drawing as a line which is heavier than the other short radial lines. These first engravings are said to be the first since, in view of the direction of rotation of the drum as indicated by an arrow 50, they are the first engravings in their respective groups to pass the head 36. A typical one of the 15 groups is enclosed by a bracket 52. The group of engravings embraces a segment of 24° on the periphery of the drum 24**. It will be noted that the same number of engravings is used in each group and the engravings in each group have the same spacial relationship since each represents the same character. There are no engravings at the end of each group (i.e., before the first or thicker engravings of a succeeding group) in order to allow space between displayed characters, as will be brought out more fully in connection with FIG. 3. The relationship among the engravings shown in FIG. 2 is not intended to denote any particular character but merely to disclose the general relationship among the stored sequences of signals.

As the drum rotates, the signal gap 39 of the stationary magnetic head 36 cuts the magnetic field around the individual permanently magnetized engravings. These magnetic fields induce magnetic flux changes in the core 38 of the head 36 which are translated into electrical signals by the signal coils 40. The magnetic material in each permanently magnetized engraving has high remanence and is strongly magnetized. Accordingly, a large amount of magnetic flux links the head 36, and the coils 40 thereby provide relatively large amplitude signals.

There is no magnetic material between the engravings. Accordingly, the spaces on the periphery of the drum between engravings give rise to very little electrical noise. The size the drum may be relatively small. A suitable size is a cylinder ten inches in circumference. Such a drum is relatively light in weight and may be driven by a low power, small, electric motor. The high signal amplitude, low noise output of the heads 36 and the rugged mechanical construction of the character signal generator made possible by the invention provides for high reliability and low maintenance requirements.

Figure 4:
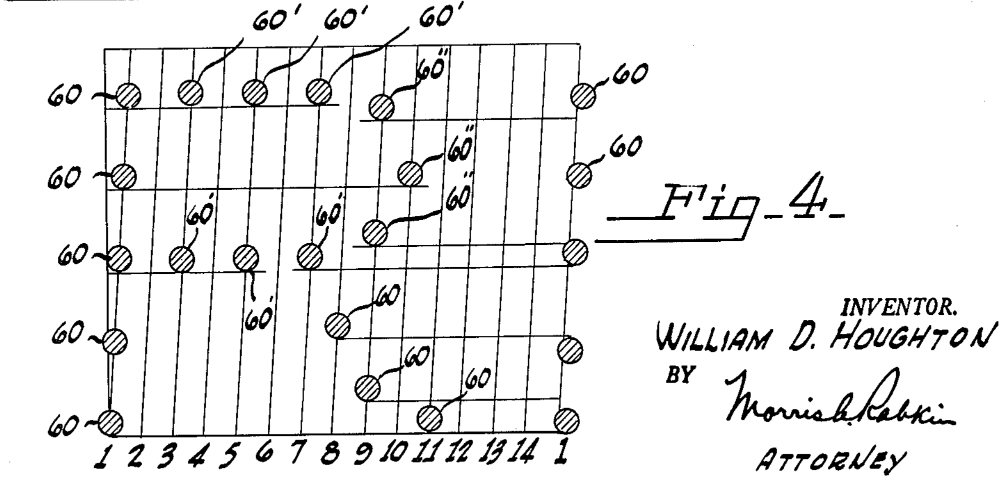
FIG. 4 is a diagrammatic view of a display device illustrating the formation of the character "R" in response to signals from the character generator illustrated in FIGS. 1 to 3.
Figure 3:
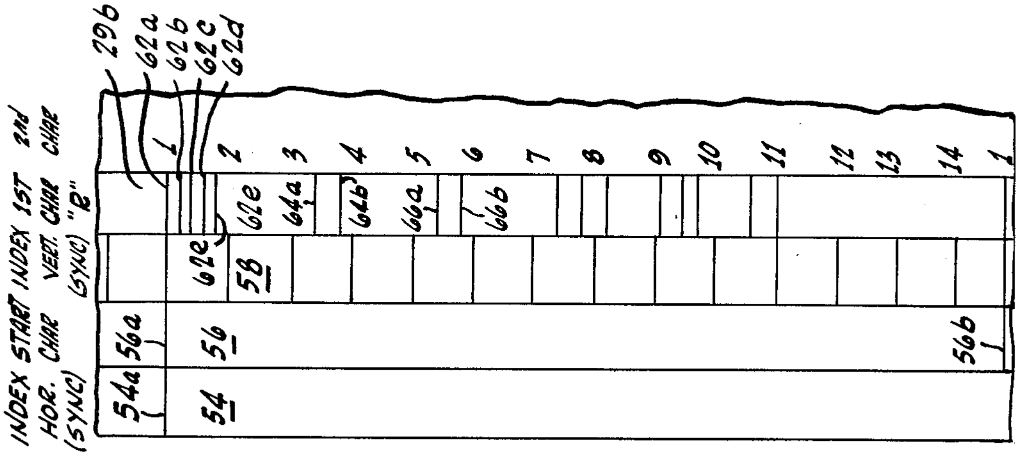
FIG. 3 is a fragmentary layout of the signals permanently stored in the character generator of FIGS. 1 and 2.

Referring more particularly to FIGS. 3 and 4 there is shown a layout of three synchronizing tracks 54, 56 and 58 and of a character track **29*b* which, in the illustrated case, stores signals which represent the character "R." The display which is produced on the screen of a cathode ray tube in response to signal from the synchronizing tracks and the character track 29*b* is shown in FIG. 4. The synchronizing track 54 has one and only one engraving 54*a* thereon. This engraving generates a signal which controls the length of a line of characters (that is, the number of characters per line). In the case of the drum 24, each of the character tracks contain 15 repetitions of the same character. By selecting characters successively from the same or different ones of the character tracks, a maximum of 15 characters may be printed for one revolution of the drum. Since there is one engraving 54*a* on the synchronizing track 54, this engraving provides an indexing pulse which indexes or starts the print-out on the next successive line after the maximum of 15 characters are readout. Of course, less than 15 characters may be printed on a single line. Also, if the indexing signal from the synchronizing track 54 is divided in frequency, more than 15 characters may be printed on a signal horizontal line. Since the signal from the engraving 54*a* is used in the system to be described in connection with FIG. 5 to control the horizontal deflection of a cathode ray tube, the signal produced by the engraving 54*a*** is called the horizontal indexing signal.

The second synchronizing track 56 provides start character signals which are used for switching purposes, as will be explained hereinafter in connection with FIG. 5. There are 15 start character engravings **56*a*, 56*b*, et seq. around the drum 24. Each of these engravings 56*a*, 56*b*, et seq. coincides with the beginning of a different one of the 15 groups of engravings which represent successive repetitions of the same character (in the illustrated case, the character "R") around the drum 24**. Each of the engravings in the character tracks produces a dot on the screen of a cathode ray tube, as will be explained hereinafter.

A third synchronizing track 58 provides vertical indexing signals and starts each of fourteen traces which describe or form an individual character. In the illustrated case, there are fourteen traces per character. Each vertical trace starts or is indexed by signals from a different one of the fourteen engravings per character on the track 58.

The fourteen engravings on the vertical synchronizing track 58 correspond to a group of engravings, such as the group enclosed by the bracket 52 (FIG. 2) which generates signals that produces the character "R" on the cathode ray tube. Different numbers of engravings, or no engravings at all, are provided in the character track 29*b* alongside each of the spaces between each pair of successive engravings in the vertical synchronizing track 58.

The successive engravings in the vertical synchronizing track, as mentioned above, correspond to the successive vertical traces which define the character. These vertical traces are shown in FIG. 4 and are numbered 1 to 14, inclusive. The characters are formed by dots 60 which are displayed and printed along each vertical trace. In describing the letter "R," five approximately equally spaced dots may be formed along the first vertical trace. Accordingly, five engravings 62*a*, 62*b*, 62*c*, 62*d* and 62*e* are provided between the first and second engravings on the vertical synchronizing track. It has been found that greater legibiilty is obtained in letters, particularly those having curved segments, where the dots 60 which form the letters are closer to each other in certain parts of the letter than in other parts thereof. In order to form the enclosed part of the letter "R" more perfectly and thereby make the letter "R" more legible, the dots 60′ form the beginning of the curved part of the "R" are spaced farther from each other than the dots 60″ which form the end of the closed part of the "R." Accordingly, no engravings are made between the second and third vertical synchronizing engravings. The first of the dots 60′ is provided by engravings 64*a* and 64*b* between the third and fourth of the vertical synchronizing engravings. Similarly, no engravings are provided between the fourth and fifth vertical synchronizing engravings. Therefore, no dots are formed on the fourth of the vertical traces which describes the character "R." The character track 29*b* includes engravings 66*a* and 66*b* between the fifth and sixth of the engravings on the vertical synchronizing track. The signals generated in response to these engravings describe the dots 60′ on the fifth of the vertical traces. It will be noted that the height of the various dots from the bottom of the letter depends upon the distance between the vertical synchronizing engravings and the engraving on the character track 29*b* which follow that vertical synchronizing engraving. For example, the engravings 62*a*, 62*b*, 62*c*, 62*d* and 62*e* which follow the first vertical synchronizing engraving, respectively, produce the dots 60 on the first vertical trace starting from the lowermost to the uppermost ones of the dots 60.

The relationship between the vertical indexing engravings and the engravings on the character track is the same for each of the fifteen groups of engravings which represent successive repetitions of the same character. In other words, the illustrated relationships between the fourteen vertical indexing engravings and the engravings on the character track 29*b* which are shown in FIG. 3 immediately adjacent thereto are repeated fifteen times around the periphery of the drum 24. Similar relationships exist between the groups of engravings which represent repetition of the other characters and symbols which are formed on the other of the character tracks 29 and the engravings in the vertical synchronizing track 58 which are associated with each group of character engravings.

The areas on the character track 29*b* alongside the area between the 12th, 13th and 14th engravings are void of character forming engravings. The other character tracks 29 are similarly void of engravings in the spaces thereon corresponding to the last three vertical engravings on the track 58. FIG. 4 shows that the absence of dots on the vertical traces 12, 13 and 14 provides a space between successive characters.

Figure 5:
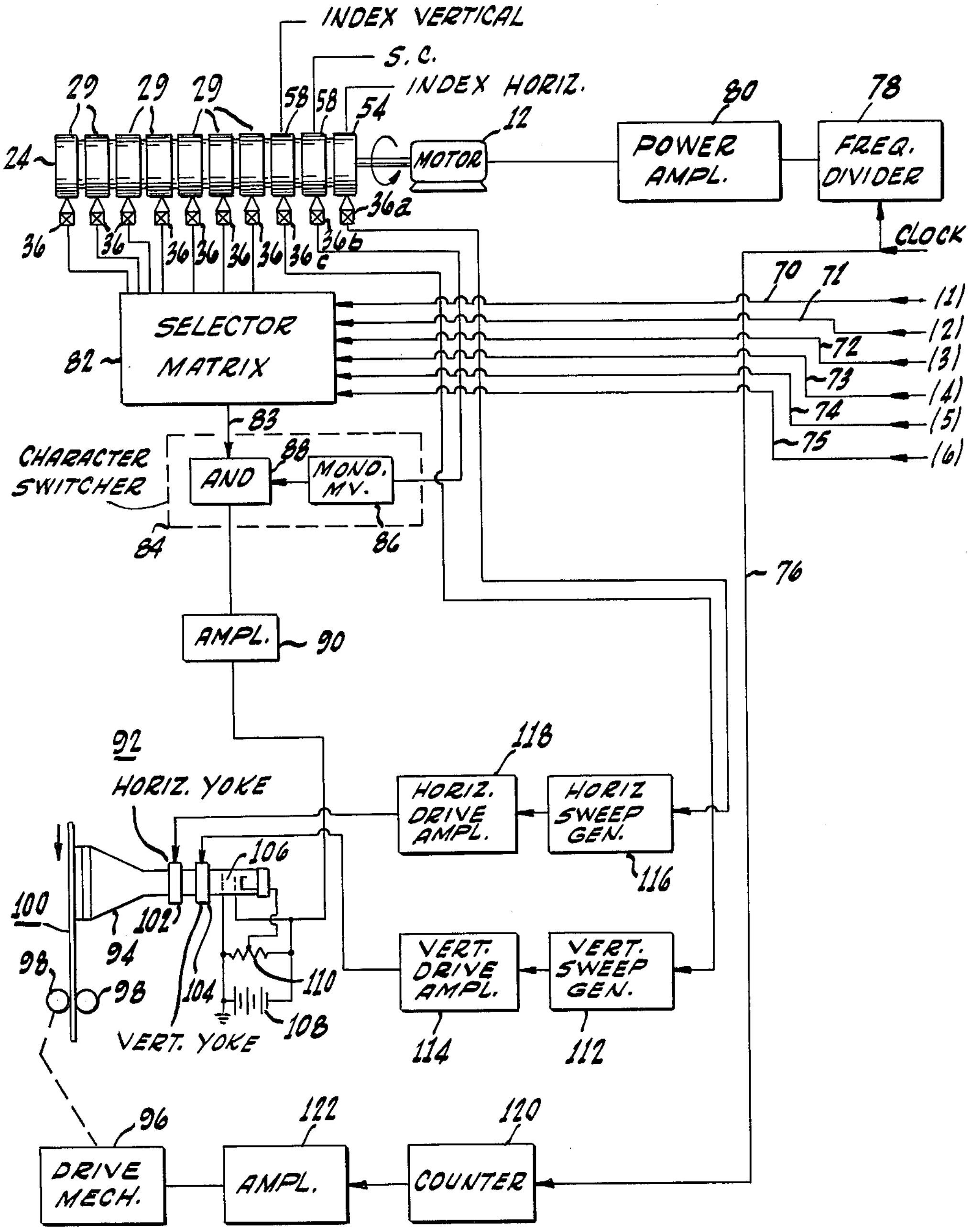
FIG. 5 is a schematic diagram, partially in block form, of a system embodying a character generator of the type shown in FIGS. 1 and 2 for translating coded information into printed characters.

FIG. 5 illustrates the system for utilizing characters generated by the drum 24 to display and print characters in response to coded information. The characters may be represented by a six bit binary code. Each of the six bits 1, 2, 3, 4, 5 and 6 is delivered from the output of a computer, for example, into six input lines 70 to 75. The computer also delivers a clock pulse into a clock input line 76. These clock pulses cause the system illustrated in FIG. 5 to operate in synchronization with the computer. The clock pulses may be at a 1 megacycle per second rate which is used in some computers. These clock pulses are applied to a frequency divider 78 which may be a chain of flip-flop circuits. The output of the frequency divider is amplified in a power amplifier 80 and used to drive the synchronous motor 12. The frequency divider may provide an output pulse at a rate of 150 cycles per second. These pulses are amplified in the power amplifier which, for example, may be an alternating current amplifier. Alternating current at a frequency of 150 cycles per second therefore drives the motor 12. If the clock rate changes, the frequency of the current supplied to the motor will change correspondingly. Accordingly, the speed of rotation of the drum corresponds to the clock rate. The computer may include a buffer storage register which stores the bits representing each character for several clock pulse periods. Assuming, for example, that the motor rotates at 150 revolutions per second, signals corresponding to the repetition of fifteen characters are produced during each cycle. Accordingly, the bits which correspond to each character should be available for approximately 450 clock pulse cycles. Hence, a buffer storage register which stores approximately 450 characters, assuming that the characters are applied to the input of the register at the clock pulse rate, will be suitable.

The magnetic heads 36 which read each of the character tracks 29 have their outputs connected to a selector matrix 82. The input lines 70 to 75 which carry the coded information representing the character or symbol to be displayed are also connected to the selector matrix. The selector matrix may be a diode decoder matrix of conventional design which provides a low impedance path between a selected one of the heads 36 which reads the signals corresponding to the character or symbol represented by the code applied to the lines 70 to 75 and the output line 83 of the matrix 82. The output line 83 is applied to a character switcher device 84. This device 84 is for the purpose of preventing a character from being displayed until after the display of a previous character has been completed and exactly at the beginning of the selected character. The start character pulses corresponding to the start of each of the successive repetitions of the respective characters are obtained from the head 36*b* which reads the start character track 56. Each of these start character pulses triggers a mono-stable multi-vibrator 86 which produces an output pulse for a period approximately equal to the duration of a character. The output of the mono-stable multi-vibrator 86 and the output 83 of the matrix 82 are applied to an "AND" gate 88. The gate 88 therefore does not open until the start of the character. Accordingly, the beginning of each character is timed by the start character pulse from the track 56. The output signals from the "AND" gate may be amplified in a pulse amplifier 90. This amplifier 90 is for the purpose of signal amplification and for isolating the "AND" gate from the display device and may have a cathode follower or emitter follower transistor output circuit.

A display and printing device 92 which is especially suitable for use with the present invention is a thin window cathode ray tube for high speed printing with electrophotographic paper. This display device includes a thin window cathode ray tube 94 and a mechanism 96 including drive rollers 98 for driving the electrophotographic paper 100. Horizontal and vertical deflecting yokes 102 and 104, respectively, are associated with the tube 94. The tube also has an electron gun 106 which may be operated by voltage from a source of operating potential, shown as a battery 108. The gun is biased to cut-off by means of circuit connections to a dropping resistor 110. Pulses from the output of the amplifier 90 are polarized to unblank the gun and allow the beam to be projected to the screen of the tube and write a dot such as one of the dots 60 (FIG. 4) thereon. The construction of the thin window cathode ray tube 94 is not described in detail herein since a full explanation thereof may be found in an article entitled, "A Thin-Window Cathode-Ray Tube for High Speed Printing With 'Electrofax,'" by R. G. Olden, appearing in the RCA Review, September 1957, volume XVIII, No. 3, pages 343 to 350, inclusive.

The vertical synchronizing pulses from the engravings on the vertical track 58 are used to control a vertical sweep generator 112. This generator may be a relaxation oscillator of the type used in the art for this purpose. The vertical sweeping signals are applied to a vertical drive amplifier 114 which provides drive current to the vertical yoke.

A horizontal sweeping generator 116 is synchronized by the synchronous signals from the indexing track 54 which signals are derived by the magnetic head **36*a*. This sweep generator may, like the vertical sweep generator, be a relaxation oscillator circuit of usual design which provides a saw tooth wave. The vertical or rear edge of the saw tooth is synchronized with the signal derived from the horizontal synchronizing track 54. Accordingly, the horizontal sweep of the beam in the tube 94 will be indexed or reset at the end of display of a maximum of fifteen characters. If more characters, for example seventy-five were desired, a frequency divider could be used which divides the rate of the pulse from the track 54 by a factor of five. This frequency divider may be a counter which provides a pulse on every fifth pulse from the head 36*a* which reads the track 54**. When such a frequency divider is used, seventy-five characters may be displayed per line.

The horizontal sweep generator output is applied to a horizontal drive amplifier 118 which provides current to the horizontal yoke 102. Horizontal deflection and vertical deflection currents are applied simultaneously to the horizontal and vertical yokes 102 and 104. Accordingly, successive vertical traces similar to those traces 1 to 14, shown in FIG. 4, are traced by the electron beam. The vertical sweep rates and the horizontal sweep rates are chosen so that fifteen, seventy-five or whatever number of characters is desired are written continuously along the same horizontal line of the tube 94. It will be noted that the last dot near the top of the character is not exactly at the maximum vertical excursion of the trace. It is desirable that the length of the vertical trace be greater than the height of the character, since flyback transients then do not affect the dots which are produced before and after the vertical retrace begins.

The velocity of the paper 100 is maintained at a value such that the proper spacing between successive lines of characters is maintained. The drive mechanism 96 may provide a continuous drive at a rate much slower than at a rate at which lines of characters will then be written at a slight inclination. This inclination may be compensated by tilting the paper somewhat with respect to the tube or vice versa so that all lines of characters are printed perpendicular to the bottom edge of the paper. The drive mechanism may, alternatively, be of the intermittent type, as used in motion picture apparatus. To this end, the drive mechanism may include a solenoid which is energized at the end of each of the successive lines of characters.

In order that the drive mechanism may present clean paper to the cathode ray tube at the proper rate, depending upon the speed of writing accounted for by the computer, clock pulses from the clock input line 76 are applied to a counter 120. This counter may count the requisite number of clock pulses which corresponds to a line of characters (by way of example when seventy-five characters are to be printed per line and the clock pulse rate is one megacycle the counter may provide an output pulse for every 3,450 clock pulses). The output of the counter is amplified in a pulse amplifier 122 and used to control the drive mechanism. If this mechanism includes a solenoid as mentioned above, the pulse from the amplifier triggers the solenoid. On the other hand, if continuous drive is desired, the output of the amplifier may be used to provide power to a motor similarly to the power amplifier 122.

From the foregoing description, it will be apparent that there has been provided improved apparatus for electrically generating characters and displaying and printing these characters. While certain numerical examples are given, these should be understood to have been given merely for purposes of explanation. Also, the illustration of the drum 24 as having fifteen repetitions of the same character has been given merely to illustrate the mode of operation of the system of the invention. More or fewer repetitions may be used depending upon the speed and size of the drum 24. Other variations in the desired system and in components thereof coming within the scope of the invention will undoubtedly be apparent to those skilled in the art. Accordingly, the foregoing description should be considered illustrative and not in any limiting sense.

What is claimed is:

1. Information translation apparatus comprising an information storage member having a plurality of tracks for storing information representing a corresponding plurality of different symbols, each of said tracks storing information representing successive repetitions of the one of said symbols corresponding thereto, each of said repetitions occupying discrete areas of said tracks, and means for selectively reading out any of said repetitions from any of said tracks and presenting said repetition in the form of the symbol which it represents.

2. Information translation apparatus comprising an information storage member having a plurality of tracks for storing information representing a corresponding plurality of different symbols, each of said tracks storing information representing successive repetitions of the one of said symbols corresponding thereto, each of said repetitions occupying discrete adjacent areas of said tracks, said areas in different ones of said tracks having corresponding positional relationships, and means for selectively reading out any of said repetitions from any of said tracks and presenting said repetition in the form of the symbol which it represents.

3. Information translation apparatus comprising a cyclically movable information storage member having a plurality of tracks thereon each for storing information representing a corresponding plurality of symbols, each of said tracks storing in each of a plurality of successive, adjacent, discrete areas thereon information representing a repetition of the same one of said plurality of symbols corresponding to said track, said areas in each of said tracks being in corresponding positional relationship, and means for reading out a plurality of said symbols from different ones of said tracks during a cyclical movement of said storage member.

4. Information translation apparatus comprising a cyclically movable information storage member having a plurality of tracks thereon each for storing information representing a corresponding plurality of symbols, each of said tracks storing in each of a plurality of successive areas thereon, information representing a repetition of the same one of said plurality of symbols corresponding to said track, said areas in each of said tracks being in corresponding positional relationship, and means for reading out a plurality of said symbols along one line of symbols from different ones of said tracks during an integral multiple of cyclical movements of said storage member.

5. Information translation apparatus comprising a rotatable information storage member having a plurality of record tracks thereon, a first of said plurality of tracks storing a plurality of signals separately and equidistant from each other along said first track, the other of said plurality of tracks providing storage for signals representing a corresponding plurality of symbols, each of said other plurality of tracks storing a plurality of successive groups of signals, each of said groups representing a repetition of the one of said plurality of symbols corresponding to its said track, each of said groups also separately corresponding to a different one of said plurality of signals on said first track, and means for reading out a symbol represented by any selected one of said groups from any one of said other plurality of tracks operative upon occurrence of a signal from said first track.

6. Information translation apparatus comprising a rotatable information storage member having a plurality of record tracks thereon, a first of said plurality of tracks storing a plurality of signals separately and equidistant from each other along said first track, the others of said plurality of tracks providing storage for signals representing a corresponding plurality of symbols, each of said others of said plurality of tracks storing a plurality of successive groups of signals, each of said groups representing a repetition of the one of said plurality of symbols corresponding to its said track, each of said groups also separately corresponding to a different one of said plurality of signals on said first track, and means for reading out a plurality of symbols from any of said others of said plurality of tracks equal in number to the number of signals stored on said first track during each cycle of rotation of said information storage member.

7. Information translation apparatus comprising:

(a) a rotatable information storage member having a plurality of record tracks thereon in parallel relationship to each other;

(b) a first of said plurality of tracks storing a plurality of signals separately and equidistant from each other along said first track;

(c) a second of said tracks storing pluralities of signals corresponding to each of said first track signals, said signals in each of said pluralities being spaced equidistant from each other along said second track;

(d) the others of said plurality of record tracks storing signals corresponding to a plurality of different symbols, each of said others of said tracks storing a plurality of groups of signals each representing a repetition of the same one of said plurality of symbols corresponding to its said track, each of said groups separately corresponding in position to a different one of said first track signals;

(e) the signals of the said pluraliities of second track signals and the said groups of signals which correspond to the same first track signals having the same positional relationships with respect to each other;

(f) and means for reading out symbols represented by signals of any selected one of said groups from any selected one of said tracks, including:

(f1) means responsive to reading of one of said first track signals for initiating readout of the selected symbol, and (f2) means to responsive to reading of successive ones of the one of said pluralities of second track signals corresponding to said one first track signal for initiating reading out of successive portions of the selected symbol.

8. Information translation apparatus which comprises:

(a) a rotatable drum having a plurality of tracks in parallel relationship around the periphery thereof, a number of said plurality of tracks having signals stored thereon which represent different ones of a corresponding number of characters;

(b) a first of said plurality of tracks storing a plurality of signals indicative of the start of a character and spaced equal distances from each other along said first track;

(c) a second of said plurality of tracks storing an integral number of signals for each of said start character signals, each of said number of second track signals corresponding to a different part of a character;

(d) each of said character tracks storing a plurality of groups of signals representing successive representations of the one of said number of characters corresponding to its said track;

(d1) each of said character track signals corresponding to different parts of the character represented thereby;

(d2) each said group being stored along its said track in areas defined by different successive pairs of said start character signals;

(d3) each of said signals in each of said groups being stored in areas defined by those of said second track signals which correspond to the same parts of the represented character;

(e) and means controlled by said start track and second track signals for displaying a character represented by any one of said groups of signals on any selected one of said tracks.

9. A character signal generator which comprises:

(a) a rotatable drum of non-magnetic material having a plurality of tracks thereon, said tracks having engravings thereon, permanently magnetizable magnetic material in each said engravings;

(b) said plurality of tracks each storing signals representing different ones of a corresponding plurality of characters, each of said tracks having a plurality of groups of engravings, each group representing a repetition of the same one of said plurality of characters corresponding to its said track; and (c) a plurality of magnetic heads separately disposed in scanning relationship with different ones of said tracks for deriving character signals from said plurality of tracks.

10. A character signal generator which comprises:

(a) a rotatable drum of non-magnetic material having a plurality of tracks thereon, said tracks having engravings thereon along lines parallel to the axis of rotation of said drum, permanently magnetizable magnetic material in each said engravings;

(b) a first of said tracks having groups of pluralities of engravings thereon;

(c) the other of said plurality of tracks each storing signals representing different ones of a corresponding plurality of characters, each of said other tracks having a plurality of groups of engravings, each group representing a repetition of the same one of said plurality of characters corresponding to its said track and corresponding to different ones of said first track groups, each engraving of each of said groups in said other tracks having a predetermined positional relationship with at least one of said first track engravings of the group of first track engravings corresponding to the group of said each engraving; and (d) a plurality of magnetic heads separately disposed in scanning relationship with different ones of said tracks, for deriving synchronizing signals from said first track and character signals from said other of said plurality of tracks.

11. A character signal generator which comprises:

(a) a rotatable drum of non-magnetic material having a plurality of tracks thereon, said tracks having engravings thereon along lines parallel to the axis of rotation of said drum, permanently magnetizable magnetic material in each said engravings;

(b) a first of said tracks having a single engraving thereon;

(c) a second of said tracks having a plurality of engravings one of which is colinear with said first track engraving and the others of which are equidistant from each other around said second track;

(d) a third of said tracks having groups of pluralities of engravings thereon, each said group corresponding to a different one of said second track engravings, the first engraving of each said group being colinear with its corresponding second track engraving each of said plurality of engravings of each of said groups being equidistant from each other;

(e) the other of said plurality of tracks each storing signals representing different ones of a corresponding plurality of characters, each of said tracks having a plurality of groups of engraving, each group representing a repetition of the same one of said plurality of characters corresponding to its said track, each of said groups being disposed along their respective tracks in areas adjacent the areas between successive pairs of said second track engravings, each engraving of each of said groups having a predetermined positional relationship with at least one of said third track engravings of one of said plurality of groups of third track engravings; and (f) a plurality of magnetic heads separately disposed in transducing relationship with different ones of said tracks, for deriving synchronizing signals from said first, second and third tracks and character signals from said other of said plurality of tracks.

12. Information translation apparatus for translating coded information representing a character into a display of said character on the screen of a cathode ray tube, said apparatus comprising:

(a) a rotatable drum having a plurality of tracks each for storing information representing different ones of a corresponding plurality of characters, said drum also having a plurality of synchronizing tracks;

(b) each of said character tracks storing signals representing repeated representations of the same one of said plurality of characters corresponding to its said track;

(c) said synchronizing tracks storing a plurality of signals for each of said repeated representations each of said plurality of signals corresponding to a different part of different ones of said stored repeated representations;

(d) means for reading signals separately out of each of said tracks;

(e) means responsive to said coded information for selecting only those signals from the track corresponding to the character represented by said information; and (f) means responsive to signals from at least two of said synchronizing tracks for respectively synchronizing one and the other of both said horizontal and vertical deflection of the beam of said tube.

13. Information translation apparatus for translating coded information representing a character into a display of said character on the screen of a cathode ray tube, said apparatus comprising:

(a) a rotatable drum having a plurality of tracks each for storing information representing different ones of a corresponding plurality of characters, said drum also having a plurality of synchronizing tracks;

(b) each of said character tracks storing signals representing repeated representations of the same one of said plurality of characters corresponding to its said track;

(c) a first of said synchronizing tracks storing a plurality of signals for each of said repeated representations each of said plurality of signals corresponding to a different part of different ones of said stored repeated representations;

(d) a second of said synchronizing tracks storing a plurality of signals each corresponding to the start of a different one of said repeated representations;

(e) a third of said tracks storing a signal corresponding to the start of one of said repeated representations;

(f) means for reading signals separately out of each of said tracks;

(g) means responsive to said coded information for selecting only those signals from the track corresponding to the character represented by said information; and (h) means responsive to signals from said first and third of said tracks for respectively synchronizing one and the other of both said horizontal and vertical deflection of the beam of said tube.

14. Information translation apparatus for translating information sequentially presented in the form of digital codes representing successive characters and clock signals into displays of said characters on the screen of a cathode ray tube, said apparatus comprising:

(a) a rotatable drum having a plurality of tracks each for storing information representing different ones of a corresponding plurality of characters, said drum also having a plurality of synchronizing tracks;

(b) means responsive to said clock signals for controlling the speed of rotation of said drum in accordance with the rate of presentation of said characters;

(c) each of said character tracks storing signals representing repeated representations of the same one of said plurality of characters corresponding to its said tracks, said character track signals each being in predetermined positional relationship with signals stored in said synchronizing tracks;

(d) means for reading signals separately out of each of said tracks;

(e) means responsive to said coded information for selecting only those signals from the track corresponding to the character represented by said information; and (f) means responsive to signals from said synchronizing tracks for synchronizing the horizontal and vertical deflection of the beam of said tube.

15. Information translation apparatus for translating information sequentially presented in the form of digital codes representing successive characters and clock signals into displays of said characters on the screen of a cathode ray tube and for recording said displays, said apparatus comprising:

(a) a rotatable drum having a plurality of tracks each for storing information representing different ones of a corresponding plurality of characters, said drum also having a plurality of synchronizing tracks;

(b) means responsive to said clock signals for controlling the speed of rotation of said drum in accordance with the rate of presentation of said characters;

(c) each of said character tracks storing signals representing repeated representations of the same one of said plurality of characters corresponding to its said tracks, said character track signals each being in predetermined positional relationship with signals stored in said synchronizing tracks;

(d) means for reading signals separately out of each of said tracks;

(e) means responsive to said coded information for selecting only those signals from the track corresponding to the character represented by said information;

(f) means responsive to signals from said synchronizing tracks for synchronizing the horizontal and vertical deflection of the beam of said tube;

(g) a light responsive recording medium for recording characters displayed on said tube screen; and (h) means controlled by said clock signals for advancing said medium to record a plurality of characters on successive lines displayed on said screen.

References Cited by the Examiner

UNITED STATES PATENTS

| | | | |
|---|---|---|---|
| 2,575,342 | 11/1951 | Gridley | 340—318 X |
| 2,679,035 | 5/1954 | Daniels et al. | 340—324.1 |
| 2,714,843 | 8/1955 | Hooven | 340—318 |
| 2,920,312 | 1/1960 | Gordon et al. | 340—324.1 |
| 2,931,022 | 3/1960 | Triest | 340—324.1 |

NEIL C. READ, *Primary Examiner.*

H. I. PITTS, *Assistant Examiner.*